United States Patent [19]

Morita et al.

[11] Patent Number: 4,808,640

[45] Date of Patent: Feb. 28, 1989

[54] THERMOSETTING RESIN COMPOSITIONS

[75] Inventors: Yoshitsugu Morita; Shoichi Shida, both of Chiba, Japan

[73] Assignee: Toray Silicone Co., Ltd., Tokyo, Japan

[21] Appl. No.: 29,037

[22] Filed: Mar. 23, 1987

[30] Foreign Application Priority Data

Apr. 1, 1986 [JP] Japan ................................. 61-74561

[51] Int. Cl.$^4$ .............................................. C08L 83/04
[52] U.S. Cl. ...................... 523/433; 524/500; 524/538; 524/541; 525/431; 525/474; 525/476; 525/477; 525/478
[58] Field of Search ............... 525/474, 477, 431, 476, 525/478; 523/433; 524/500, 538, 541

[56] References Cited

U.S. PATENT DOCUMENTS 4,663,397  5/1987  Morita ................................ 525/410
4,677,161  6/1987  Suzuki ................................ 525/478

*Primary Examiner*—C. Warren Ivy
*Attorney, Agent, or Firm*—Robert Spector

[57] ABSTRACT

Curable thermosetting resin compositions comprise a continuous phase of a curable thermosetting organic or a curable thermosetting silicone resin containing dispersed finely divided particles of a cured composition prepared by reacting 1) an organopolysiloxane, 2) a curing agent for the organopolysiloxane, 3) an alkoxy group-containing organosilicon compound and 4) a compound of aluminum or zirconium where this compound is an alkoxide, phenoxide, carboxylate or a derivative of a beta- dicarbonyl compound or o-hydroxyketone. Ingredients 3) and 4) can be prereacted and the cured composition optionally contains a filler. The presence of ingredients 3) and 4) imparts improved adhesion between the continuous an dispersed phases of the composition.

8 Claims, No Drawings

THERMOSETTING RESIN COMPOSITIONS

BACKGROUND OF THE INVENTION

1. Field of the Invention

The present invention relates to a thermosetting resin composition. More specifically, the present invention relates to a thermosetting resin composition obtained by blending into a curable thermosetting resin a cured organosiloxane composition in powdered form. The excellent adhesion between these two ingredients results in a cured composition with reduced water infiltrability compared with compositions containing prior art cured organosiloxane powders, an excellent flexibility, a low coefficient of thermal expansion and a small mold shrinkage.

2. Description of the Prior Art

Thermosetting resin compositions are widely used as insulating materials for various electric and electronic components and are fabricated by means such as transfer molding, injection molding, potting, casting, powder coating, immersion coating and dripping. These compositions exhibit excellent electrical properties, including dielectric properties, volume resistivity, and insulation breakdown strength, and excellent mechanical properties, including bending strength, compressive strength, and impact strength.

While the coefficients of thermal expansion and shrinkage ratios of the elements of electric and electronic parts are small, the resins have large values. The large difference between these values and the rigidity of the resins results in excessive internal stress being applied to the elements or other structural materials of the electric or electronic part during molding or baking or any subsequent thermal cycle. As a consequence, when the resins are used to seal, for example, an electric or electronic component, the element frequently will not function properly or part of the element may be broken. Furthermore, this difference in coefficients of thermal expansion and shrinkage ratios cause cracking in the thermosetting resin itself, and may cause the generation of gaps between the electric or electronic part and the thermosetting resin. Water can infiltrate into such gaps and can result in degradation of the element.

Prior efforts at improving the properties of thermosetting resins have not had as their goal reducing the aforementioned differences in the coefficient of thermal expansion or post-molding shrinkage ratio. For example, Japanese Patent Publication 52-36534 [36,534/77] is concerned with improving the surface lubricity of resin moldings by blending organopolysilsesquioxane powder into phenolic resins.

Japanese Laid Open Patent Application [Kokai] Number 52-14643 [14,643/77] is concerned with improving the abrasion resistance of synthetic resins against metal by use of a very finely divided cured material composed principally of an organopolysiloxane and an inorganic filler as the filler for the synthetic resin. However, the cured compositions described in both of the aforementioned patent publications exhibit unsatisfactory thermal expansion, post-molding shrinkage ratio and flexural modulus of elasticity.

Japanese Laid Open Patent Application Number 58-219218 [219,218/83], describes the present inventors efforts to solve these problems by blending a finely divided cured material containing at least 10 percent by weight of a linear siloxane moiety into the thermosetting resin. Furthermore, in Japanese Laid Open Patent Application Number 59-96122 [96,122/84], the present inventors propose using spherical particles of a material that has been cured into an elastomer during spraying. However, when the aforementioned finely divided cured material or microfine spherical cured material is blended into a thermosetting resin, water easily infiltrates into the spaces between the very finely particulate cured material and the thermosetting resin due to poor bonding to the thermosetting resin. This is particularly true for very finely particulate cured material consisting of 100 wt % linear siloxane moiety.

U.S. Pat. No. 4,663,397, which issued on May 5, 1987 in the names of Y. Morita, one of the present inventors, and A. Shirahata describes thermosetting resin compositions comprising a curable organic thermosetting resin and a cured polyorganosiloxane resin having repeating units of the formulae $R^1R^2R^3SiO_{0.5}$ and $R^4SiO_{1.5}$. Any additional repeating units are of the formula $R^5R^6SiO$, $SiO_2$ and/or are derived from block copolymers of polyorganosiloxane resins and organic resins. The substituents represented by $R^1$–$R^6$ are individually selected from hydrogen atoms and monovalent hydrocarbon radicals. These compositions suffer from the same disadvantages as other prior art compositions with respect to poor adhesion between the two types of materials present in the molded composition. The poor adhesion allows water to infiltrate into the final cured composition.

SUMMARY OF THE INVENTION

It has now been found that thermosetting resin compositions can be prepared that yield moldings having, in particular, an excellent flexibility, small coefficient of thermal expansion and small mold shrinkage ratio; which will not soil the metal mold nor suffer from exudation onto the surface of the cured material during molding; and which exhibits reduced water infiltrability as compared with the use of prior cured powders. This objective is achieved by adding to the thermosetting resin a finely particulate cured material exhibiting excellent adhesion to the thermosetting resin.

DETAILED DESCRIPTION OF THE INVENTION

This invention provides a thermosetting resin composition comprising (A) 100 parts by weight of a curable thermosetting resin;

(B) from 0.1 to 100 parts by weight, based on the weight of said composition following curing, of a material obtained by curing a reaction mixture comprising (a) 100 parts by weight of an organopolysiloxane exhibiting a viscosity of at least 0.010 Pa.s at 25 degrees C, where the organic groups bonded to silicon are identical or different monovalent hydrocarbon radicals, (b) from 0 to 100 parts by weight of a filler, (c) from 0.3 to 40 parts by weight of a curing agent for said organopolysiloxane, and (d) from 0.1 to 20 parts by weight of an alkoxy group-containing organosilicon compound represented by the formula $R^1_aSi(OR^2)_{4-a}$ where $R^1$ is a monovalent hydrocarbon radical or a monovalent organofunctional group consisting essentially of an epoxy, amino, methacryloxy or mercapto group that is bonded to the silicon atom of said organosilicon compound through at least one carbon atom and a is 1, 2 or 3, and (e) from 0.001 to 5 parts by weight of a compound of either aluminum or zirconium, where said compound is an alkoxide, a phenoxide, a carboxylate, or a derivative of said compound wherein one or more of the alkoxide, phenoxide or carboxylate groups is replaced by an organic ligand which is either a betadiketone or a o-hydroxyketone, with the proviso that when said curing agent is a hydrolyzable group-containing organosilane, ingredients (d) and (e) are added as a preformed heat reaction product, Each ingredient of the present compositions will now be explained in detail.

The thermosetting resin constituting ingredient (A) is the base material of the present composition, and all thermosetting resins known in the art can be used as this ingredient. This ingredient is exemplified by phenolic resins, formaldehyde resins, xylene resins, xylene-formaldehyde resins, ketone-formaldehyde resins, furan resins, urea resins, imide resins, melamine resins, alkyd resins, unsaturated polyester resins, aniline resins, sulfonamide resins, silicone resins, epoxy resins and copolymers derived from two or more of these resins. Of these, phenolic resins, imide resins, epoxy resins and silicone resins are particularly preferred. Ingredient (A) may consist of a single resin or a mixture of 2 or more resins.

Furthermore, the present thermosetting resin composition may contain the curing agents, curing catalysts, higher fatty acid metal salts, ester waxes and plasticizers, etc., typically used for thermosetting resins, as well as those fillers as exemplified by part (b) of ingredient (B) to be discussed below.

Ingredient (B) is the cured material obtained from a composition of the aforementioned ingredients (a) through (e), ingredient (b) being optional. When dispersed as a fine powder into ingredient (A), ingredient (B) makes the thermosetting resin flexible and reduces the coefficient of thermal expansion, the shrinkage ratio after molding and the shrinkage ratio after baking. Furthermore, the infiltration of water is prevented by virtue of the excellent adhesion between the thermosetting resin comprising ingredient (A) and the cured fine powder comprising ingredient (B).

The principal material in ingredient (B) is the organopolysiloxane comprising ingredient (a).

Because the types of organopolysiloxanes suitable for use as ingredient (a) range from straight chain molecules to cyclic compounds to network resins and mixtures thereof, the viscosity of these organopolysiloxanes at 25 degrees C. can vary widely from 10 cP (0.01 Pa.s) to that of a gum or solid. It is undesirable for this viscosity to be below 10 cP (0.01 Pa.s) because the cured material will then be brittle. Straight-chain organopolysiloxanes with a viscosity of at least 50 cP (0.05 Pa.s) at 25 degrees C. are preferred.

The organic groups bonded to silicon in the siloxane units of ingredient (a) are monovalent hydrocarbon radicals, which may or may not be identical, and which are exemplified by alkyl radicals such as methyl, ethyl, propyl and butyl; cycloalkyl radicals such as cyclohexyl; alkenyl groups such as vinyl and allyl; aryl radicals such as phenyl and xylyl; aralkyl radicals such as phenylethyl; and halogenated monovalent hydrocarbon radicals such as gamma-chloropropyl and 3,3,3-trifluoropropyl. Among these monovalent hydrocarbon radicals, methyl, phenyl and vinyl are the most frequently used, and methyl in particular is the most frequently used, based on the availability of the corresponding starting materials. The molecular terminals of ingredient (a) can be a triorganosilyl groups such as trimethylsilyl, dimethylvinylsilyl, dimethylphenylsilyl or methylvinylphenylsilyl; hydroxyl groups; or alkoxy groups. The types of monovalent hydrocarbon radicals in the siloxane units, the type of group present at the molecular chain terminals and the viscosity of ingredient (a) are to be suitably selected from a consideration of the purpose of application and the type of curing agent selected.

While it is preferred that a straight-chain organopolysiloxane be used alone as ingredient (a), the presence of an organopolysiloxane resin as a portion or all of ingredient (a) is permissible. When the resin is used as a portion of ingredient (a) the type of organopolysiloxane resin is not particularly restricted. When the resin constitutes the entire ingredient (a), it must contain at least 10 mol% and preferably 30 mol% of $R_2SiO_{2/2}$ units, where R represents a monovalent hydrocarbon radical, and at least 1, and preferably a plurality of linear organopolysiloxane blocks-$[—R_2SiO]_n$, where n is at least 10, preferably at least 20 and more preferably at least 30, must be present. This requirement is established by the fact that this ingredient must impart flexibility to the thermosetting resin when blended into ingredient (A).

The filler constituting ingredient (b) is optional and functions to impart the required strength or color to the cured product obtained from ingredient (B). This ingredient is exemplified by fumed silica, hydrophobicized fumed silica, precipitated silica, hydrophobicized precipitated silica, fused silica, fine quartz powder, diatomaceous earth, talc, aluminum silicate, alumina, aluminum hydroxide, calcium carbonate, zinc oxide, titanium dioxide, ferric oxide, glass fiber, glass beads, glass balloons, silicon carbide, nitrogen carbide, manganese carbonate, carbon black, graphite, cerium hydroxide, pigments, etc.

Ingredient (b) is present in amounts of from 0 to 100 parts by weight per 100 parts of ingredient (a).

The curing agent comprising ingredient (c) has the capability of curing ingredient (a). Other than this requirement, the type of curing agent and the mechanism by which ingredient (a) is cured are not critical. Typical curing methods include the addition reaction of organohydrogenpolysiloxanes with silicon- bonded alkenyl radicals in the presence of a platinum catalyst, curing by means of a free radical reaction using an organoperoxide and heat, and curing in the presence or absence of catalyst by the condensation of ingredient (a) with an organosilane having hydrolyzable groups.

Additional methods of curing utilize radiation and include exposure to gamma-rays, ultraviolet radiation or electron beams. Among these various curing methods for ingredient (B) the most preferred one involves curing by means of an addition reaction in the presence of a platinum catalyst using an organohydrogenpolysiloxane as the curing agent.

The organohydrogenpolysiloxane used in the addition reaction type of curing can be linear, cyclic or have a network configuration, and can be a homopolymer or copolymer. The only requirements are that the organohydrogensiloxane contain at least 2 silicon-bonded hydrogen atoms in each molecule, and that it have a viscosity within the range of from 1 to 10,000 cP (0.001 to 10 Pa.s) at 25 degrees C. The organohydrogensiloxane is preferably a linear or cyclic molecule. The silicon-bonded substituents other than hydrogen are monovalent hydrocarbon radicals exemplified by methyl, ethyl, butyl, phenyl and 3,3,3-trifluoropropyl. Methyl is particularly preferred among these. When an organohydrogenpolysiloxane is used as the curing agent, ingredient (a) must contain at least 2 silicon-bonded alkenyl groups in each molecule, and its viscosity is preferably within the range of from 100 to 100,000 cP (0.1 to 100 Pa.s) at 25 degrees C. The organohydrogenpolysiloxane is added in a quantity sufficient to provide from 0.5 to 5, preferably from 0.7 to 2 silicon-bonded hydrogen atoms per silicon-bonded alkenyl group in ingredient (a). This condition is usually satisfied by the addition of 0.3 to 40 parts by weight of organohydrogenpolysiloxane per 100 weight parts ingredient (a).

The platinum-group metal used in addition reaction type of curing are exemplified by finely divided elemental platinum, finely divided platinum dispersed on carbon powder, chloroplatinic acid, chloroplatinic acid-olefin coordination compounds, chloroplatinic acid-vinylsiloxane coordination compounds, tetrakis(triphenylphosphine)palladium and rhodium catalysts. The platinum-group metal is present at a concentration equivalent to from 0.1 to 1000 ppm by weight, preferably from 0.5 to 200 ppm, of platinum group metal, based on the weight of ingredient (a).

Organoperoxides used in free radical type curing reactions are exemplified by 2,4-dichlorobenzoyl peroxide, benzoyl peroxide, dicumyl peroxide, di-t-butyl perbenzoate and 2,5-bis(t-butylperoxy)benzoate. The organoperoxide is used at a concentration of from 0.1 to 10 parts by weight, preferably from 0.2 to 5 parts, per 100 parts by weight of ingredient (a).

When the reaction used to cure ingredient (a) involves condensation with an organosilane containing a plurality of hydrolyzable groups, ingredient (a) must contain at least 2 silicon-bonded hydroxyl or alkoxy groups in each molecule. In addition, the organosilane must contain at least 2 silicon-bonded hydrolyzable groups in each molecule. Such organosilanes are exemplified by organoalkoxysilanes, organoacyloxysilanes, organooximesilanes, organoaminoxysilanes, organoaminosilanes, organoamidosilanes, organovinyloxysilanes, organoisocyanatosilanes, and the partial hydrolysis condensates of these silanes. The organosilane is generally present at a concentration of from 0.1 to 20 parts be weight, preferably from 0.2 to 10 parts per 100 parts of ingredient (a).

The alkoxy group-containing organosilicon compound that constitutes ingredient (d) is an essential to improving the adhesion between ingredient (B) and ingredient (A) when ingredient (B) is dispersed in ingredient (A). This alkoxy group-containing organosilicon compound is an organoalkoxysilane with the general formula

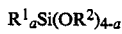

$R^1_a Si(OR^2)_{4-a}$ where $R^1$ is a monovalent hydrocarbon radical or a monovalent organofunctional group, $R^2$ is an alkyl group or alkoxy-substituted alkyl group, and a is 1, 2 or 3). Alternatively, ingredient (d) can be a partial hydrolysis condensate of the aforementioned organoalkoxysilane. The monovalent hydrocarbon radicals represented by $R^1$ are exemplified by methyl, ethyl, propyl, vinyl, allyl and phenyl, and the functional portion of the organofunctional groups is exemplified by epoxy, amino, methacryloxy and mercapto. The functional portion is bonded to the silicon atom of the organoalkoxysilane through at least one carbon atom.

Ingredient (d) is preferably an alkoxysilane in which a is 1 or 2 and which contains at least one unsaturated or organofunctional group as the remaining substituents on silicon.

The organoalkoxysilanes are exemplified by
vinyltrimethoxysilane
vinyltriethoxysilane
methylvinyldimethoxysilane
vinyltris(2-methoxyethoxy)silane
gamma-methacryloxypropyltrimethoxysilane
gamma-methacryloxypropylmethyldiethoxysilane
gamma-glycidoxypropyltrimethoxysilane
2-(3,4-epoxycyclohexylethyl)trimethoxysilane
gamma-mercaptopropyltriethoxysilane
gamma-aminopropyltrimethoxysilane and
gamma-(2-aminoethylamino)propyltrimethoxysilane In those instances when the curing method for ingredient (a) consists of a condensation reaction using a hydrolyzable group-containing organosilane as ingredient (c), ingredient (d) is preferably added as a reaction product with ingredient (e).

Ingredient (d) is added in the range of from 0.1 to 20 parts by weight, preferably from 0.5 to 10 parts by weight, per 100 parts by weight of ingredient (a). The ability to self-bond is not generated when the concentration of ingredient (d) is below this range, while the properties of the cured product are adversely affected when this range is exceeded.

The aluminum compound or zirconium compound constituting ingredient (e) serves to further improve adhesion between ingredients (A) and (B) by its combined use with ingredient (d). The aluminum compounds and zirconium compounds are the alkoxides, phenoxides and carboxylates and these compounds wherein one or more of the alkoxide, phenoxide or carboxyl groups are replaced by organic ligands as described hereinafter. The alkoxy groups are exemplified by methoxy, ethoxy and iso-propoxy; the phenoxy groups are exemplified by phenoxy and p-methylphenoxy; and the carboxyl groups are exemplified by acetoxy, propionyloxy, isopropionyloxy, butyroxy and stearyloxy. The aforementioned examples are not limiting.

Compounds useful in the present invention are, for example, aluminum triisopropoxide, aluminum t-butoxide, aluminum triacetate, aluminum tristearate and aluminum tribenzoate. Furthermore, in these compounds, 1 or more of the alkoxy, phenoxy or carboxyl groups can be substituted by organic ligands, examples of which are beta-diketone compounds and o-hydroxyketone compounds. The beta-diketone compounds will have the following chemical formulas (1), (2) or (3).

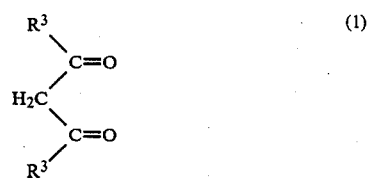

(1)

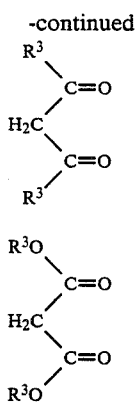

(2)

(3)

In these formulae $R^3$ represents an alkyl radical or halogen-substituted alkyl radical.

The o-hydroxyketone compounds have chemical formula (4).

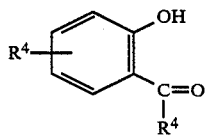

In this formula $R^4$ represents a hydrogen atom, an alkyl radical, a halogen-substituted alkyl radical or an alkoxy group.

The zirconium compounds useful as ingredient (e) are analogs of the aforementioned aluminum compounds. Specific examples are $Zr(OH)_2(C_2H_3O_2)_2$ and $Zr(CH_3COCHCOCH_3)_4$.

As discussed above, in some cases ingredient (e) will be reacted beforehand with ingredient (d) by heating. The resultant reaction product having Al-O-Si bonds is then added to ingredient (a).

When too little ingredient (e) is added, the adhesion will not be improved. The addition of too much ingredient (e) is uneconomical, although the properties of the present compositions will not be significantly adversely affected. Accordingly, ingredient (e) is used in the range of from 0.001 to 5 parts by weight, preferably from 0.01 to 3 parts, per 100 parts by weight of ingredient (a).

In addition to the aforementioned ingredients (a) through (e), ingredient (B) may as necessary contain various additives, including but not limited to reaction inhibitors, organic solvents, waxes and antimolds.

The cured ingredient (B) can be pulverized at room temperature, or possibly after freezing with dry ice or liquid nitrogen, or using a grinder. Also, as taught in Japanese Patent Application Laid Open Number 59-68333 [68,333/84], it may be sprayed, in the presence or absence of solvent, into a current of hot air in order to produce a spherical cured material. The particle size of the powder will vary with the application, but it is generally 1 mm, preferably 300 microns and particularly preferably 100 microns.

The thermosetting resin composition of the present invention is consists of a dispersion of ingredient (B) in ingredient (A). These two ingredients can be mixed with each other at any stage, and any mixer can be employed.

EXAMPLES

The present invention will now be explained using examples of execution and comparison examples. In the examples and comparison examples, all parts are by weight, and all viscosities are measured at 25 degrees C. The various properties were measured using the following standards or methods.

(1) Coefficient of thermal expansion: a sample postcured for 5 hours at 180 degrees C. was evaluated according to ASTM D696.

(2) Bending modulus of elasticity: determined by the bending test of Japanese Industrial Standard (JIS) K6911.

(3) Mold shrinkage ratio: a molding, obtained by molding in a metal mold and then cooling to room temperature, was evaluated in accordance with JIS K6911.

(4) Shrinkage ratio after postcuring: the molding described in (3) above was postcured under the conditions specified in the particular example, cooled to room temperature, and then evaluated in accordance with JIS K6911.

(5) Micrograph observations: the rupture surface of the test specimen fractured in (2) above was inspected by viewing a micrograph obtained using a scanning electron microscope, and the adhesion between ingredient (B) and the thermosetting resin composition was evaluated on the basis of the presence or absence of voids.

(6) Water absorption ratio: a $2 \times \frac{1}{2} \times \frac{1}{4}$ inch ($50.8 \times 12.7 \times 6.4$ mm) molding is postcured and then immersed in boiling water for 10 hours. The weight change is then measured.

Production of Ingredient (B)

Production of cured powders A, A1, A2 and A3

Cured powder A was prepared by adding six parts of a dimethylhydrogensiloxy terminated dimethylpolysiloxane containing an average of 10 repeating units per molecule [ingredient (c)], 2 parts diphenyldimethoxysilane and 3 parts gamma-glycidoxypropyltrimethoxysilane [ingredient (d)], and 0.1 part aluminum acetylacetonate [ingredient (e)] to 100 parts dimethylvinylsiloxy-terminated dimethylpolysiloxane with a viscosity of 800 cP (0.8 Pa.s) and blending the resultant mixture to homogeneity. To this was then added an isopropanol solution of chloroplatinic acid equivalent to 10 ppm of platinum based on the weight of ingredient (a). The resultant mixture was cured by heating it in convection oven at 150 degrees C. for 1 hour, followed by cooling and pulverization. The material passing 100 mesh was designated as cured powder A.

For the comparison examples, a cured powder A1 was produced by omitting only the diphenyldimethoxysilane and gamma-glycidoxypropyltrimethoxysilane constituting ingredient (d) from the aforementioned composition. A cured powder A2 was produced by omitting only the aluminum acetylacetonate constituting ingredient (d), and a cured powder A3 was produced by omitting both ingredients (d) and (e).

Production or cured powders B, B1, B2 and B3

Cured powder B was prepared by blending to homogeneity 100 parts dimethylvinylsiloxy-terminated dimethylpolysiloxane with a viscosity of 1,000 cP (1 Pa.s) and 5 parts methylphenylpolysiloxane resin containing 3 wt % Si-bonded OH groups and composed of 40 mol % methylsilsequioxane units 10 mol % phenylmethylsiloxane units, 40 mol % phenylsilsesquioxane units and 10 mol % diphenylsiloxane units, these two materials together constituting ingredient (a); 10 parts fused silica as ingredient (b); 10 parts of a methylhydrogenpolysiloxane with the structure

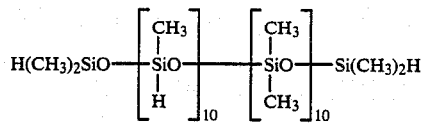

as ingredient (c); 5 parts vinyltrimethoxysilane as ingredient (d)); 0.05 parts zirconium acetylacetonate as ingredient (e); an isopropanol solution of chloroplatinic acid equivalent to 10 ppm of platinum based on the weight of the aforementioned ingredient (a); and 0.1 part 3-methyl-1-butyne-3-ol as a catalyst inhibitor. The resultant mixture was cured by heating it in a convection oven at 150 degrees C. for 1 hour, followed by cooling and pulverization. The powder passing 100 mesh was designated as cured powder B.

For the comparison examples, as in the case of cured powder A, a cured powder B1 was produced by omitting only the vinyltrimethoxysilane, ingredient (d), from the above composition; a cured powder B2 was produced by omitting only the zirconium acetylacetonate ingredient (e); and a cured powder B3 was produced by omitting both ingredients (d) and (e).

Production of cured powders C, C1, C2 and C3

100 Parts dimethylvinylsiloxy-terminated dimethylpolysiloxane with a viscosity of 2,000 cP (2 Pa.s) as ingredient (a) was mixed with 2 parts methylhydrogenpolysiloxane with the structure

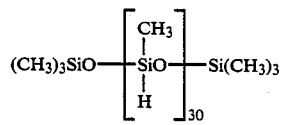

as ingredient (c), 4 parts methyltrialkoxysilane and 4 parts gamma-methacryloxypropyltrimethoxysilane, together serving as ingredient (d), 0.5 parts dibutoxyaluminum triethoxysilane as ingredient (e), and an isopropanol solution of chloroplatinic acid equivalent to 10 ppm of platinum based on the weight of ingredient (a). The resultant composition was sprayed from a rotary nozzle into a spray dryer (hot air entrance temperature =230 degrees C.) and cured to obtain a spherical cured powder C having particle diameters of from 10 to 100 microns.

For the comparison examples, a spherical cured powder C1 was produced by omitting only the methyltrialkoxysilane and gamma-methacryloxypropyltrimethoxysilane ingredient (d) from the aforementioned composition; a spherical cured powder C2 was produced by omitting only the dibutoxyaluminum triethoxysilane constituting ingredient (e); and a spherical cured powder C3 was produced by omitting both ingredients (d) and (e).

Production of cured powders D and D3

Cured powder D was prepared by blending to homogeneity 100 parts of a dimethylpolysiloxane gum [ingredient (a)] composed of 99.5 mol% dimethylsiloxane units and 0.5 mol% methylvinylsiloxane units, 10 parts fumed silica as ingredient (b), 0.75 parts 2,4-dichlorobenzoyl peroxide as ingredient (c), 3 parts methylvinyldimethoxysilane and 3 parts gamma-methacryloxypropyltrimethoxysilane as ingredient (d), and 0.5 parts dibutoxyaluminum triethoxysilane as ingredient (e). The mixture was vulcanized at 120 degrees C. under a pressure of 30 kg/cm$^2$ (2.94 MPa) for 10 minutes, followed by cooling and pulverization. The material passing 100 mesh was designated as cured powder D.

For the comparison example, cured powder D3 was prepared by omitting both ingredients (d) and (e) from the aforementioned composition.

Production of cured powder E

For purposes of comparison, a powder was produced from the methylpolysilsesquioxane resin obtained by hydrolysis condensation of methyltrichlorosilane. The material passing 100 mesh was designated cured powder E.

EXAMPLE 1

A thermosetting phenol novolac resin composition was obtained by mixing and kneading 30 parts of a phenol novolac resin (softening point =80 degrees C., hydroxyl group equivalent weight =100) with 6 parts cured powder A, 70 parts fused quartz powder, 4 parts hexamethylenetetramine and 1 part carnauba wax using a hot-roll at 90 degrees C., followed by pulverization.

This resin composition was then transfer molded at a temperature of 175 degrees C. under a pressure of 70 kg/cm$^2$ (6.9 MPa) for 3 minutes, and postcured at 150 degrees C. for 2 hours. The various properties of this molding are reported in Table 1.

For the comparison examples, moldings were prepared exactly as described in Example 1 except that 6 parts cured powder A1, A2 or A3 were used in place of the cured powder A of Example 1, or no cured powder was added. The various properties of these moldings were measured, and these results reported in Table 1.

TABLE 1

| composition and properties | example 1 | comparison examples 1 | 2 | 3 | 4 |
|---|---|---|---|---|---|
| (a) phenol novolac resin (parts) | 30 | 30 | 30 | 30 | 30 |
| (b) cured powder A (parts) | 6 | — | — | — | — |
| A1 | — | 6 | — | — | — |
| A2 | — | — | 6 | — | — |
| A3 | — | — | — | 6 | — |
| mold shrinkage, % | 0.08 | 0.08 | 0.09 | 0.07 | 0.26 |
| shrinkage after postcuring, % | 0.12 | 0.13 | 0.12 | 0.15 | 0.20 |
| bending elasticity modulus, | 1080 | 1090 | 1050 | 1080 | 1470 |

TABLE 1-continued

| composition and properties | example 1 | comparison examples | | | |
|---|---|---|---|---|---|
| | | 1 | 2 | 3 | 4 |
| (kg/mm$^2$) | | | | | |
| coefficient of thermal expansion ($\times 10^5$/degree C.) | 0.3 | 0.4 | 0.3 | 0.5 | 1.4 |
| inspection (gaps) | no | yes | yes | yes | — |
| water absorption, % | 0.42 | 0.49 | 0.51 | 0.59 | 0.31 |

EXAMPLE 2

Thermosetting phenol novolac resin compositions were prepared by the method of Example 1, with the exception that in the respective cases 6 parts cured powder B, or B1 or B2 or B3 were used in place of cured powder A in Example 1. Molding is carried out as in Example 1, the various properties were measured and the results are reported in Table 2. Comparison Example 4 from Example 1 is also given in Table 2 for reference.

TABLE 3

| composition and properties | example 3 | comparison examples | | | |
|---|---|---|---|---|---|
| | | 8 | 9 | 10 | 11 |
| (a) polyimide resin (parts) | 30 | 30 | 30 | 30 | 30 |
| (b) cured powder C (parts) | 6 | — | — | — | — |
| C$^1$ | — | 6 | — | — | — |
| C$^2$ | — | — | 6 | — | — |
| C$^3$ | — | — | — | 6 | — |
| mold shrinkage, % | 0.55 | 0.56 | 0.55 | 0.55 | 0.63 |
| shrinkage after postcuring, % | 0.30 | 0.31 | 0.31 | 0.29 | 0.47 |
| bending elasticity modulus, (kg/mm$^2$) | 990 | 1010 | 1000 | 1010 | 1320 |
| coefficient of thermal expansion ($\times 10^5$/degree C.) | 1.5 | 1.5 | 1.5 | 1.5 | 1.7 |
| inspection (gaps) | no | yes | yes | yes | — |
| water absorption, % | 0.51 | 0.61 | 0.58 | 0.57 | 0.42 |

EXAMPLE 3

Thirty parts of a thermosetting polyimide resin BT2480 (Mitsubishi Gas Chemical Co., Inc.) were mixed and kneaded with 6 parts cured powder C, 70 parts fused quartz powder, 0.6 parts carnauba wax and 0.25 parts aluminum benzoate on a hot-roll at 90 degrees C. The resulting mixture was removed and pulverized to obtain a curable thermosetting polyimide resin composition.

This resin composition was then transfer molded for 6 minutes at a temperature of 200 degrees C. under a pressure of 70 kg/cm$^2$ (6.9 MPa), and postcured at 230 degrees C. for 3 hours. Various properties of this molding were measured, and the results are reported in Table 3.

In the comparison examples, compositions were prepared as above using 6 parts cured powder C1, C2 or C3 in place of cured powder C, or without the addition of cured powder. Moldings are prepared as described for Example 3, and their various properties are measured. These results are also reported in Table 3.

EXAMPLES 4 AND 5

As shown in Table 4, 20 parts cresol novolac epoxy resin (softening point = 80 degrees C., epoxy equivalent weight = 220) and 10 parts of the phenol novolac resin described in Example 1 were blended to homogeneity together with either 10 parts cured powder A or D, 70 parts fused silica, 0.4 parts carnauba wax and 0.1 part 2-methylimidazole. Mixing and kneading of the resultant mixture on a hot-roll at 90 degrees C. was followed by pulverization to yield a thermosetting epoxy resin composition. This resin composition was then transfer molded for 2 minutes at 175 degrees C. under a pressure of 70 kg/cm$^2$ (6.9 MPa), followed by postcuring at 180 degrees C. for 12 hours. The various properties of this molding are reported in Table 4.

For the comparison examples, compositions were prepared using 10 parts A3 in place of cured powder A, or D3 in place of D, or no cured powder is added. These compositions were molded as above and their various properties were measured. The values are also reported in Table 4.

TABLE 4

| composition and properties | examples | | comparison examples | | |
|---|---|---|---|---|---|
| | 4 | 5 | 12 | 13 | 14 |
| (a) cresol novolac epoxy resin (parts) | 20 | 20 | 20 | 20 | 20 |
| phenol novolac resin (parts) | 10 | 10 | 10 | 10 | 10 |
| (b) cured powder A (parts) | 10 | — | — | — | — |
| D | — | 10 | — | — | — |
| A3 | — | — | 10 | — | — |
| D3 | — | — | — | 10 | — |
| mold shrinkage, % | 0.35 | 0.37 | 0.34 | 0.35 | 0.48 |
| shrinkage after postcuring, % | 0.25 | 0.23 | 0.25 | 0.27 | 0.43 |
| bending elasticity modulus, (kg/mm$^2$) | 920 | 950 | 930 | 900 | 1350 |
| coefficient of thermal expansion ($\times 10^5$/degree C.) | 1.5 | 1.6 | 1.6 | 1.6 | 2.1 |
| inspection (gaps) | no | no | yes | yes | — |
| water absorption, % | 0.29 | 0.31 | 0.35 | 0.37 | 0.25 |

EXAMPLE 6

As shown in Table 5, 15 parts of a methylphenylpolysiloxane resin composed of 40 mol% methylsilsesquioxane units, 10 mol% phenylmethylsiloxane units, 40 mol% phenylsilsesquioxane units and 10 mol% diphenylsiloxane units, containing 3 wt% Si-bonded OH groups) and 15 parts cresol novolac epoxy resin having a softening point of 80 degrees C. and an epoxy equivalent weight of 220 were mixed and kneaded with 6 parts cured powder B, 70 parts fused quartz powder and 1 part carnauba wax on a hot-roll at 90 degrees C. The resultant material was removed and pulverized to yield a curable thermosetting silicone-epoxy resin composition of this invention. This resin composition was then transfer molded for 2 minutes at a temperature of 175 degrees C. under a pressure of 70 kg/cm$^2$, and postcured at 180 degrees C. for 12 hours. The various properties of this molding were measured and these results are reported in Table 5.

In the comparison examples, compositions were prepared using 6 parts cured powder E in place of cured powder B, or without the addition of cured powder. These were molded by the method described above and their various properties were measured. The results are also reported in Table 5.

TABLE 5

| composition and properties | example | comparison examples | |
|---|---|---|---|
| | 6 | 15 | 16 |
| (a) silicone resin (parts) | 15 | 15 | 15 |
| epoxy resin (parts) | 15 | 15 | 15 |
| (b) cured powder B (parts) | 6 | — | — |
| E | — | 6 | — |
| mold shrinkage, % | 0.38 | 0.48 | 0.52 |
| shrinkage after postcuring, % | 0.32 | 0.36 | 0.43 |
| bending elasticity modulus, (kg/mm$^2$) | 1050 | 1130 | 1350 |
| coefficient of thermal expansion ($\times 10^5$/degree C.) | 2.4 | 2.7 | 2.9 |
| inspection (gaps) | no | yes | — |

TABLE 5-continued

| composition and properties | example | comparison examples | |
|---|---|---|---|
| | 6 | 15 | 16 |
| water absorption, % | 0.53 | 0.62 | 0.42 |

The preceding examples demonstrate the excellent adhesion generated because the thermosetting resin composition of the present invention is composed of a thermosetting resin and the cured product obtained from an organopolysiloxane composition, wherein said cured product contains both an alkoxy group-containing organosilicon compound and certain compounds of either aluminum or zirconium. Because the cured organopolysiloxane is dispersed in the curable thermosetting resin in the form of very fine particles, the material obtained by curing the present compositions is characterized by a reduced water infiltrability compared with blends prepared using prior art cured powders, and also exhibits an excellent flexibility, small coefficient of thermal expansion and small post-molding shrinkage ratio.

Thermosetting resin composition of this invention are very useful for the production of precision moldings, as sealants, casting agents, coating materials and powdered paints for diverse electric and electronic components such as transistors, diodes, integrated circuits, thermistors, transformer coils and resistors.

That which is claimed is:

1. A curable thermosetting resin composition comprising
   (A) 100 parts by weight of a curable thermosetting resin;
   (B) from 0.1 to 100 parts by weight, based on the weight of said composition following curing, of a material obtained by curing a reaction mixture comprising
      (a) 100 parts by weight of an organopolysiloxane exhibiting a viscosity of at least 0.010 Pa.s at 25 degrees C., where the organic groups bonded to silicon are identical or different monovalent hydrocarbon radicals,
      (b) from 0 to 100 parts by weight of a filler,
      (c) from 0.3 to 40 parts by weight of a curing agent for said organopolysiloxane, and
      (d) from 0.1 to 20 parts by weight of an alkoxy group-containing organosilicon compound represented by the formula $R^1{}_a Si(OR^2)_{4-a}$ where $R^1$ is a monovalent hydrocarbon radical or a monovalent organofunctional group consisting essentially of an epoxy, amino, methacryloxy or mercapto group that is bonded to the silicon atom of said organosilicon compound through at least one carbon atom and a is 1, 2 or 3, and (e) from 0.001 to 5 parts by weight of a compound of either aluminum or zirconium, where said compound is an alkoxide, a phenoxide, a carboxylate, or a derivative of said compound wherein one or more of the alkoxide, phenoxide or carboxylate groups is replaced by an organic ligand which is of either a betadiketone or a o-hydroxyketone, with the proviso that when said curing agent is a hydrolyzable group-containing organosilane, ingredients (d) and (e) are added as a preformed heat reaction product, and where ingredient (B) is dispersed in the form of a fine powder in ingredient (A).

2. A composition according to claim 1 wherein the thermosetting resin comprising ingredient (A) is an epoxy resin, phenolic resin, imide resin or silicone resin.

3. A composition according to claim 2 wherein the cured product comprising ingredient (B) is elastomeric and cured by means of a platinum catalyzed addition reaction or a peroxide initiated free radical reaction.

4. A composition according to claim 1 where at least one of the $R^1$ substituents is methyl, ethyl, propyl, vinyl, allyl or phenyl, the functional portion of the organofunctional group is epoxy, amino, methacryloxy or mercapto and is bonded to the silicon atom of the organoalkoxysilane through at least one carbon atom.

5. A composition according to claim 1 where said alkoxy group-containing organosilicon compound is present at a concentration of from 0.5 to 10 parts by weight per 100 parts of said organopolysiloxane.

6. A composition according to claim 4 where said alkoxy group-containing organosilicon compound is a silane selected from the group consisting of
vinyltrimethoxysilane
vinyltriethoxysilane
methylvinyldimethoxysilane
vinyltris(2-methoxyethoxy)silane
gamma-methacryloxypropyltrimethoxysilane
gamma-methacryloxypropylmethyldiethoxysilane
gamma-glycidoxypropyltrimethoxysilane
2-(3,4-epoxycyclohexylethyl)trimethoxysilane
gamma-mercaptopropyltriethoxysilane
gamma-aminopropyltrimethoxysilane and
gamma-(2-aminoethylamino)propyltrimethoxysilane 7. A composition according to claim 1 where said compound is aluminum acetylacetonate, zirconium acetylacetonate, or dibutoxyaluminum triethoxysilane.

8. A compositions according to claim 1 wherein the average particle size of ingredient (B) is no larger than 300 microns.

* * * * *